United States Patent [19]

Kurosawa

[11] Patent Number: 5,303,103
[45] Date of Patent: Apr. 12, 1994

[54] HEAD DRIVE MECHANISM WITH RESILIENT SIGNAL TRANSMITTING MEMBER

[75] Inventor: Yuichi Kurosawa, Tokyo, Japan

[73] Assignee: Asahi Kogaku Kogyo Kabushiki Kaisha, Tokyo, Japan

[21] Appl. No.: 588,016

[22] Filed: Sep. 25, 1990

[30] Foreign Application Priority Data

Sep. 26, 1989 [JP] Japan .................................. 1-251330

[51] Int. Cl.⁵ ............................................. G11B 21/08
[52] U.S. Cl. ............................................. 360/106
[58] Field of Search ................................. 360/106

[56] References Cited

U.S. PATENT DOCUMENTS 4,733,315  3/1988  Okuyama et al. ................ 360/106
4,881,140 11/1989  Ghose et al. ..................... 360/106

FOREIGN PATENT DOCUMENTS 0234442  9/1987  European Pat. Off. .
64-14785  1/1989  Japan .

*Primary Examiner*—Robert S. Tupper
*Attorney, Agent, or Firm*—Sandler, Greenblum & Bernstein

[57] ABSTRACT

A head drive mechanism is disclosed which is associated with a disk drive device for rotatably mounting a disk member. The head drive mechanism comprises a head member capable of recording signals on the disk member and reproducing the same from the disk member. A carriage is provided for mounting the head member thereon, and a drive mechanism drives the carriage to slide in a direction parallel to the surface of the disk member. A signal transmitting member is electrically connected at one end with the head member and secured on the support member. The other end of the signal transmitting member is secured at a predetermined position which is fixed with respect to the disk drive device. The signal transmitting member is formed to have a resilient force for biasing the support member in a direction opposite to the direction in which the drive mechanism drives the carriage.

15 Claims, 1 Drawing Sheet

FIG. I
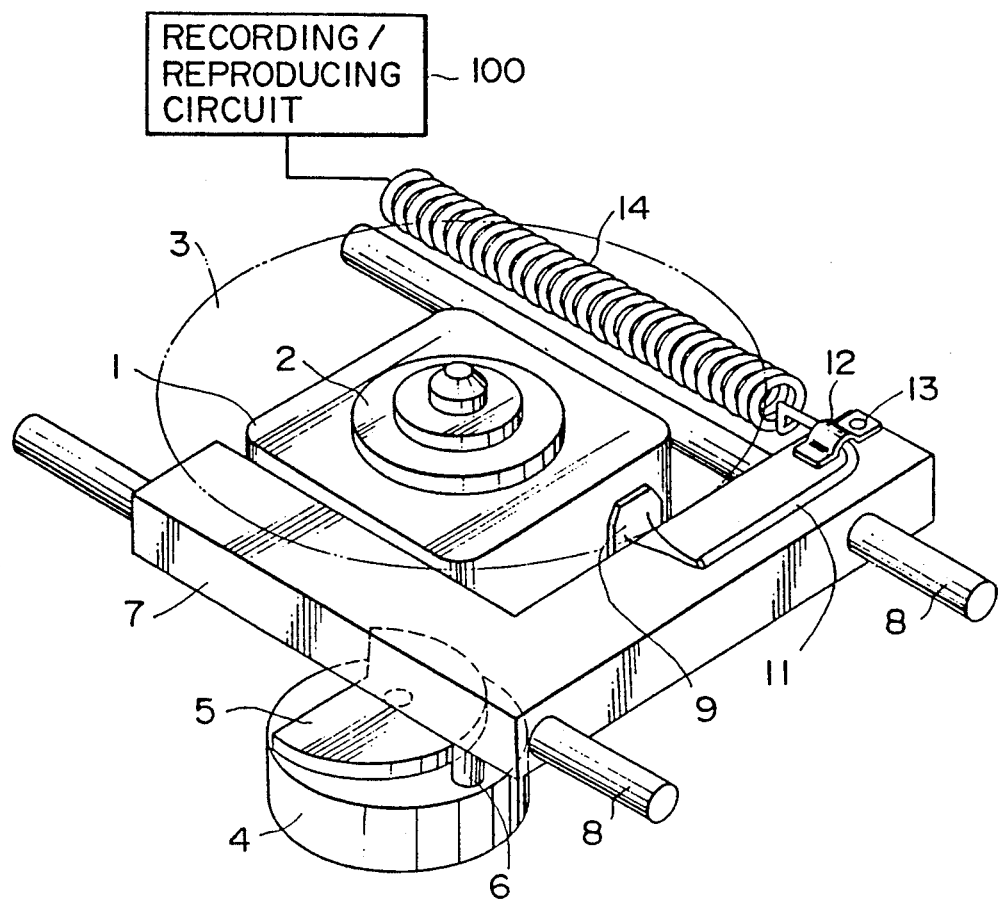
RECORDING / REPRODUCING CIRCUIT — 100
FIG. 2
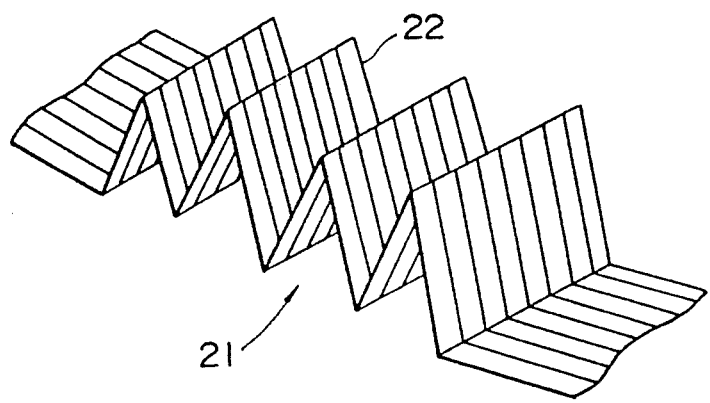

HEAD DRIVE MECHANISM WITH RESILIENT SIGNAL TRANSMITTING MEMBER

BACKGROUND OF THE INVENTION

The present invention relates to a head drive mechanism to be associated with a disk drive device in an electronic still video camera or the like.

In an electronic still video camera, video signals are recorded or reproduced by making a magnetic head access a predetermined track of a video floppy disk. The magnetic head is mounted on a carriage and is moved so that it can access a desired track, the carriage being driven in the radial direction of the disk.

Conventionally, a spring or the like is employed for biasing a carriage in the direction where the carriage is moved by a drive means to ensure that the carriage is moved without shaking.

However, the use of such a spring for biasing a carriage is disadvantageous in that the number of parts and production cost tends to increase.

SUMMARY OF THE INVENTION

It is therefore an object of the present invention to provide an improved head drive mechanism which decreases production cost as well as the number of parts.

For the above object, according to the invention, there is provided a head drive mechanism associated with a disk drive device which is capable of rotatably mounting a disk member. The head drive mechanism comprises a head member capable of recording signals onto the disk member and reproducing the same from the disk member.

A supporting member is provided for mounting the head member thereon, and a drive mechanism is provided for driving the supporting member to slide in a direction parallel to the surface of the disk member.

A signal transmitting device is provided for transmitting signals. One end of the signal transmitting device is electrically connected to the head member, and secured on the support member. The other end of the signal transmitting device is secured at a predetermined position which is fixed with respect to the disk drive device. The signal transmitting member is formed to apply a resilient force on the support member for biasing it in a direction opposite to the direction in which the drive mechanism drives the supporting member.

In the head drive thus constructed a part of a signal transmission means, such as a cord, a flexible printed board or the like, is formed with respective biasing portions such as curled or bent portions. The carriage is pressed against the drive mechanisms with the biasing force derived from the curled or bent portions.

As a result, a spring for biasing the carriage becomes unnecessary, thus contributing to a significant cost reduction.

DESCRIPTION OF THE ACCOMPANYING DRAWINGS

FIG. 1 is a perspective view of a head drive mechanism embodying the present invention; and FIG. 2 is an alternate perspective view illustrating a embodiment of the signal transmission means of the present invention.

DETAILED OF THE EMBODIMENTS

FIG. 1 is a perspective view of a head drive mechanism embodying the present invention.

As shown in FIG. 1, the head drive mechanism comprises a spindle motor 1 used for rotating a flywheel (spindle chuck) 2. A video floppy disk 3 may be mounted and chucked on the flywheel 2 for being rotated. A motor 4 is used for rotating a cam 5 as a drive means, the motor 4 being fixed to a chassis (not shown). A cam follower 6 is secured to a carriage 7, the cam follower 6 being pressed against the cam 5. Guide bars 8 are used for guiding the carriage 7, and a magnetic head 9 is mounted on the carriage 7.

A cord 11 is a signal transmission means and one of its ends is connected to the magnetic head 9. Part of the cord 11 is fastened onto the carriage 7 by means of a metal fitting 12 fitted to the carriage 7 with a screw 13. Another part of the cord 11 is curled to form a curled section 14 so as to form a kind of spring. The other end of the curled section 14 which generates biasing force is fastened to the chassis and the like, and also connected to a recording/reproducing circuit (not shown).

When an instruction as to recording a video signal is given, for instance, the motor 4 is driven and the cam 5 is rotated. The external shape of the cam 5 is formed in such a fashion that the distance from the center of rotation is made gradually greater along its periphery. As a result, the cam follower 6 which is abutted against the cam 5, and the carriage 7 which is fastened thereto, move along the guide bar 8 in a direction parallel to the surface of the video floppy disk 3.

As shown in FIG. 1, the curled or spiraled section 14 is disposed substantially parallel to the guide bar 8, due to the biasing force of the curled section 14, the cam follower 6 of the carriage 7 remains pressed against the cam 5. Consequently, the carriage 7 is moved smoothly without shaking.

When the magnetic head 9 reaches a position opposite to a predetermined track, the motor 4 is stopped and the carriage 7 stops at that position.

A video signal to be recorded is subsequently supplied from the recording/reproducing circuit 100 to the end of the curl section 14 of the cord 11 a predetermined timing. The video signal is transmitted via the curl section 14 to the magnetic head 9 and recorded on the predetermined track of the video floppy disk 3.

When signal reproducing is instructed, the magnetic head 9 is caused to access a predetermined track as in the preceding case. The signal thus reproduced by the magnetic head 9 is supplied via the curl section 14 to the recording/reproducing circuit, demodulated and delivered to a CRT or the like (not shown).

FIG. 2 shows an additional embodiment of the signal transmission means in the head drive mechanism of the present invention.

In this embodiment, a flexible printed board 21 is employed as a signal transmission means with bent sections 22 formed in part as a biasing part.

A lateral force is generated by the bent sections 22 formed by folding back the flexible printed board 21 a plurality of times as shown, thus causing the carriage 7 to be biased by the lateral biasing force.

Although a cam has been used as the drive means in the aforementioned embodiments, the drive means is not limited to such a cam but may be a lead screw, rack, pinion or the like.

Although a description has been given of the present invention as applied to an electronic still video camera, the present invention is applicable to other apparatus.

As set forth above, the signal transmission means for transmitting a signal to the head in this head drive mechanism according to the present invention is provided with a biasing part such as a curled or bent section which creates a biasing force causing the carriage to press against the drive means. Consequently, no special spring for pressing the carriage against the drive means is needed, and this makes cost reduction possible.

What is claimed is:

1. A head drive mechanism associated with a disk drive device, said disk drive device being capable of rotatably mounting a disk member, said head drive mechanism comprising a head member capable of recording signals onto said disk member and reproducing said signals from said disk member, said head drive mechanism further comprising:
   a supporting member for supporting said head member;
   drive means for driving said supporting member to move along a path of movement in a direction parallel to a surface of said disk member; and
   a signal transmitting member for transmitting signals, one end of said signal transmitting member being electrically connected to said head member and secured to said supporting member, another end of said signal transmitting member being secured at a predetermined position which is fixed with respect to said disk drive device, said signal transmitting member being formed to have a resilient force to be applied to said supporting member for biasing said supporting member toward one position located in the path of movement of said supporting member.

2. The head drive mechanism according to claim 1, wherein said signal transmitting member comprises a cord member formed to be a spring.

3. The head drive mechanism according to claim 1, wherein said signal transmitting member comprises a flexible print board folded back a plurality of times, whereby bent portions of said flexible print board generate resilient force.

4. The head drive mechanism according to claim 1, which further comprises guide means for guiding said supporting member in the direction in which said head member moves in the radial direction of said disk member, and wherein said drive means comprises a rotary cam member having a predetermined cam surface, and wherein said supporting member comprises a cam follower to be engaged with said cam surface, said supporting member sliding in a direction parallel to the biasing force of said transmitting member due to sliding contact of said cam follower with said cam surface.

5. The head drive mechanism according to claim 1, wherein said drive means comprises a cam member which engages a portion of said supporting member and means for moving said cam member.

6. The head drive mechanism according to claim 5, wherein said portion of said supporting member comprises a cam follower.

7. The head drive mechanism according to claim 6, wherein said moving means rotates said cam member.

8. The head drive mechanism according to claim 7, wherein said moving means comprises a motor.

9. The head drive mechanism according to claim 1, wherein said one position is defined by the positional relation between said supporting member and said drive means.

10. The head drive mechanism according to claim 5, wherein said one position is defined by the positional relation between said portion of said supporting member and said cam member.

11. The head drive mechanism according to claim 10, wherein said one position is the position of said supporting member at which said portion of said supporting member engages said cam member.

12. A head drive mechanism associated with a storage device which stores signals on a storage medium, said head drive mechanism comprising:
   a head member capable of transferring signals between said storage medium and a signal transmitting member;
   a supporting member for supporting said head member;
   drive means for driving said supporting member to move along a path of movement in a direction parallel to a surface of said storage medium; and
   means for biasing said supporting member toward one position located in the path of movement of said supporting member, said biasing means consisting essentially of said signal transmitting member, one end of said signal transmitting member being electrically connected to said head member and secured to said supporting member, another end of said signal transmitting member being secured at a predetermined position which is fixed with respect to said storage device, said signal transmitting member being formed to have a resilient force to be applied to said support member for biasing said supporting member.

13. The head mechanism according to claim 12, wherein said storage device comprises a disk drive device, said storage medium comprises a disk, and said head member is capable of recording signals onto said disk and reproducing said signals from said disk.

14. A head drive mechanism associated with a storage device which stores signals on a storage medium, said head drive mechanism comprising:
   a head member capable of transferring signals between said storage medium and a signal transmitting member;
   a supporting member for supporting said head member;
   drive means for driving said supporting member to move along a path of movement in a direction parallel to a surface of said disk member; and
   means for biasing said supporting member toward one position located in the path of movement of said supporting member, said biasing means comprising said signal transmitting member, one end of said signal transmitting member being electrically connected to said head member and secured to said supporting member, another end of said signal transmitting member being secured at a predetermined position which is fixed with respect to said disk drive device, said signal transmitting member being formed to have a resilient force to be applied to said supporting member for biasing said supporting member.

15. The head mechanism according to claim 14, wherein said storage device comprises a disk drive device, said storage medium comprises a disk, and said head member is capable of recording signals onto said disk and reproducing said signals from said disk.

* * * * *